(12) United States Patent
Viswanadham (10) Patent No.: US 9,554,238 B2
(45) Date of Patent: Jan. 24, 2017

(54) METHODS AND SYSTEMS FOR FORMING A WIRELESS COMMUNICATION LINK

(71) Applicant: Google Inc., Mountain View, CA (US)

(72) Inventor: Prerepa Viswanadham, Fremont, CA (US)

(73) Assignee: Google Inc., Mountain View, CA (US)

( * ) Notice: Subject to any disclaimer, the term of this patent is extended or adjusted under 35 U.S.C. 154(b) by 1 day.

(21) Appl. No.: 14/581,812

(22) Filed: Dec. 23, 2014

(65) Prior Publication Data

US 2016/0183035 A1 Jun. 23, 2016

(51) Int. Cl.
*H04W 76/02* (2009.01)
*H04W 4/00* (2009.01)
*H04W 84/18* (2009.01)

(52) U.S. Cl.
CPC ........... *H04W 4/008* (2013.01); *H04W 76/023* (2013.01); *H04W 84/18* (2013.01)

(58) Field of Classification Search
CPC .................................................. H04W 76/025
See application file for complete search history.

(56) References Cited

U.S. PATENT DOCUMENTS

| 2011/0105024 | A1* | 5/2011 | Palin et al. | 455/41.2 |
| 2012/0196534 | A1* | 8/2012 | Kasslin et al. | 455/41.2 |
| 2013/0040574 | A1* | 2/2013 | Hillyard | 455/41.2 |
| 2015/0126117 | A1* | 5/2015 | Wong et al. | 455/41.2 |
| 2015/0133052 | A1* | 5/2015 | Reunamaki et al. | 455/41.2 |

* cited by examiner

*Primary Examiner* — David Bilodeau
(74) *Attorney, Agent, or Firm* — McDonnell Boehnen Hulbert & Berghoff LLP (57) ABSTRACT

An example method performed by a first computing device executing an operating system includes receiving a request to form, with a second computing device, a wireless communication link, and sending, to the second computing device, a first message representing the request to form the wireless communication link. The method also includes prior to the operating system providing to the application a notification that the wireless communication link has been formed, sending, to the second computing device, a second message representing a request to receive data via the wireless communication link to confirm that the wireless communication link has been formed. The method also includes receiving, from the second computing device, the data confirming that the wireless communication link has been formed, and based on receiving the data, sending via the operating system to the application, the notification indicating that the wireless communication link has been formed.

20 Claims, 4 Drawing Sheets

METHODS AND SYSTEMS FOR FORMING A WIRELESS COMMUNICATION LINK

BACKGROUND

Unless otherwise indicated herein, the materials described in this section are not prior art to the claims in this application and are not admitted to be prior art by inclusion in this section.

Computing devices such as personal computers, laptop computers, tablet computers, smart phones, wearable computing devices, and related peripheral devices are prevalent in numerous aspects of modern life. For example, one user may operate a smart phone, a laptop computer, a keyboard, and a mouse, possibly simultaneously. With increasing users of multiple portable devices, the demand for wireless technology continues to play a role in the use of such portable devices. As such, various forms of wireless technology have evolved to connect these portable devices for numerous applications. One wireless technology standard for exchanging data between portable devices is Bluetooth.

Bluetooth is commonly used for wirelessly connecting a device with one or more other devices over a short range. For example, Bluetooth may be used to connect a cell phone to a wireless headset, possibly allowing for hands-free use of the phone. In some instances, Bluetooth may also be used to connect the cell phone to audio speakers and a microphone of a motor vehicle, possibly allowing for hands-free use of the phone while operating the vehicle.

Bluetooth Low Energy (Bluetooth LE or BLE, sometimes referred to as Bluetooth Smart) is an extension of the Bluetooth standard that was merged into the Bluetooth standard in 2010. The BLE standard also enables wireless communication between various types of devices, and is primarily aimed at applications in the healthcare, fitness, security, and home entertainment industries. As the name implies, the BLE standard is intended to reduce power consumed over the course of wireless communication between devices, when compared to the original Bluetooth standard.

SUMMARY

In one example, a method is performed by a first computing device executing an operating system. The method includes receiving a request for the first computing device to form, with a second computing device, a wireless communication link. The request is received via the operating system from an application executed by the first computing device. The method further includes sending, to the second computing device, a first message representing the request to form the wireless communication link. The method further includes, prior to the operating system providing to the application a notification that the wireless communication link has been formed, sending, to the second computing device, a second message representing a request to receive data via the wireless communication link to confirm that the wireless communication link has been formed. The method further includes receiving, from the second computing device, the data confirming that the wireless communication link has been formed. The method further includes, based on receiving the data, sending via the operating system to the application, the notification indicating that the wireless communication link has been formed.

Another example includes a computer-readable medium storing instructions therein that when executed by a first computing device cause the first computing device to perform functions. The first computing device is configured to execute an operating system. The functions include receiving a request for the first computing device to form, with a second computing device, a wireless communication link. The request is received via the operating system from an application executed by the first computing device. The functions further include sending, to the second computing device, a first message representing the request to form the wireless communication link. The functions further include, prior to the operating system providing to the application a notification that the wireless communication link has been formed, sending, to the second computing device, a second message representing a request to receive data via the wireless communication link to confirm that the wireless communication link has been formed. The functions further include receiving, from the second computing device, the data confirming that the wireless communication link has been formed. The functions further include, based on receiving the data, sending via the operating system to the application, the notification indicating that the wireless communication link has been formed.

In yet another example, a computing device configured to execute an operating system includes one or more processors and a computer-readable medium storing instructions therein that when executed by the one or more processors cause the computing device to perform functions. The functions include receiving a request for the computing device to form, with a second computing device, a wireless communication link. The request is received via the operating system from an application executed by the computing device. The functions further include sending, to the second computing device, a first message representing the request to form the wireless communication link. The functions further include, prior to the operating system providing to the application a notification that the wireless communication link has been formed, sending, to the second computing device, a second message representing a request to receive data via the wireless communication link to confirm that the wireless communication link has been formed. The functions further include receiving, from the second computing device, the data confirming that the wireless communication link has been formed. The functions further include, based on receiving the data, sending via the operating system to the application, the notification indicating that the wireless communication link has been formed.

In yet another example, a computing device configured to execute an operating system includes means for receiving a request for the computing device to form, with a second computing device, a wireless communication link. The request is received via the operating system from an application executed by the computing device. The computing device further includes means for sending, to the second computing device, a first message representing the request to form the wireless communication link. The computing device further includes means for, prior to the operating system providing to the application a notification that the wireless communication link has been formed, sending, to the second computing device, a second message representing a request to receive data via the wireless communication link to confirm that the wireless communication link has been formed. The computing device further includes means for receiving, from the second computing device, the data confirming that the wireless communication link has been formed. The computing device further includes means for, based on receiving the data, sending via the operating system to the application, the notification indicating that the wireless communication link has been formed.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

In some examples, a first computing device may fail in an attempt to establish, with a second computing device, a wireless communication link (e.g., that conforms to a Bluetooth Low Energy (BLE) standard). For instance, an application executed by the first computing device may send, to an operating system of the first computing device, a request to establish the wireless communication link. The operating system may then cause the first computing device to send, to the second computing device, a message representing the request to form the wireless communication link. However, the wireless communication link might not be formed because, for example, the second computing device did not receive the message from the first computing device. According to conventional BLE communication protocols, the operating system may send a notification to the application indicating that the wireless communication link has been formed, notwithstanding that confirmation of the wireless communication link has not been received from the second computing device. Upon receiving the notification, the application may proceed to operate as if the wireless communication link has been formed (e.g., by providing data to be sent to the second computing device via the wireless communication link). The application erroneously operating as if the wireless communication link has been formed may cause the application to "crash," "hang," or otherwise cause the first computing device to malfunction.

To help alleviate this problem, prior to sending any notification to the application that the wireless communication link has been formed, the first computing device may send, to the second computing device, a second message representing a request to receive data via the wireless communication link to confirm that the wireless communication link has been formed. Upon receiving the requested data from the second computing device, the first computing device may then send to the application, via the operating system, a notification that the wireless communication link has been formed. The application may then utilize the wireless communication link with a reduced risk that the wireless communication link has lapsed or was never formed in the first place.

Figure 1:
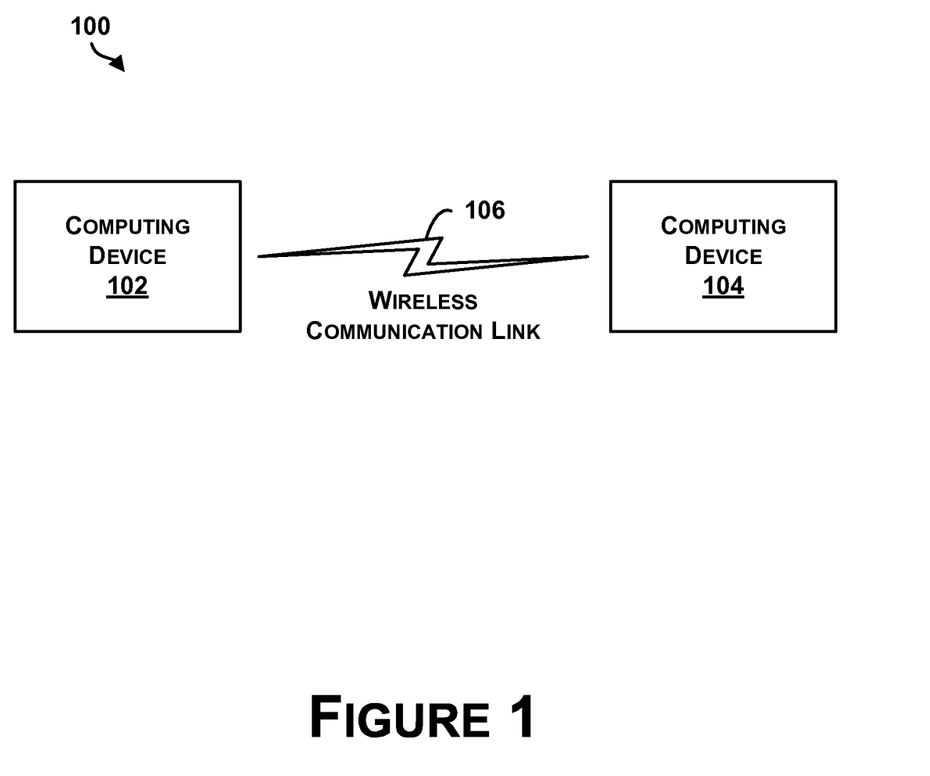
FIG. 1 illustrates an example wireless communication system.

Referring now to the figures, FIG. 1 illustrates an example wireless communication system 100. The wireless communication system 100 may include a first computing device 102 and a second computing device 104. The first computing device 102 and the second computing device 104 may communicate with each other via a wireless communication link 106. In one example, the wireless communication link 106 may be a BLE wireless communication link operable to utilize a frequency-division multiple access (FDMA) scheme and/or a time-division multiple access (TDMA) scheme to support voice and/or data communication. For example, the wireless communication link 106 may include a plurality of channels (e.g., frequency bands), allocated into advertising channels and data channels. Within advertising channels, the first computing device 102 or the second computing device 104 may function as an advertiser device or a scanner device, among other possibilities. That is, the computing devices 102 and 104 may each be configured to broadcast availability of collected data or scan for data advertised by another device. Within data channels, the first computing device 102 may operate as a master device while the second computing device 104 operates as a slave device (or vice versa).

The computing devices 102 and 104 may each be or include any type of device configured to communicate via the wireless communication link 106. By way of example, the computing devices 102 and 104 may each be or include a mobile phone, a desktop computer, a laptop computer, a tablet computer, a wearable computer, or any other type of computing device. Accordingly, the computing devices 102 and 104 may each include suitable logic, circuitry, and/or stored program code operable to initiate communication via the wireless communication link 106.

Figure 2:
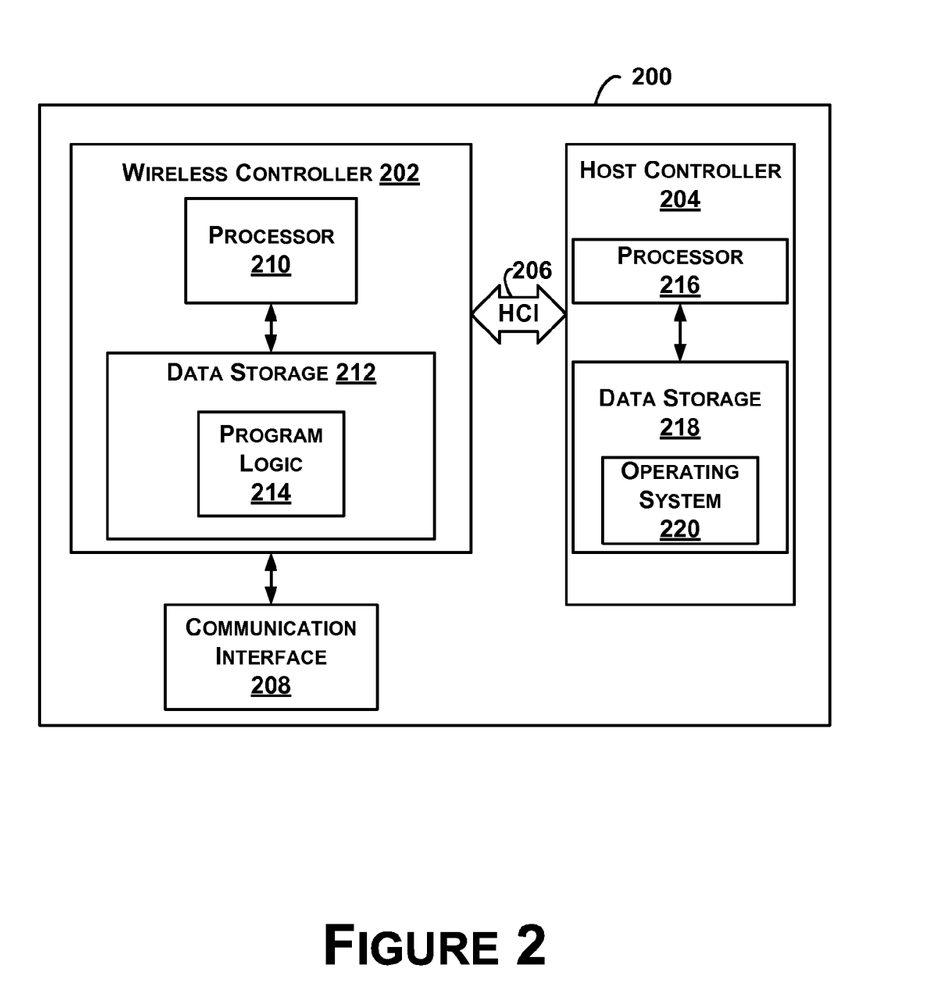
FIG. 2 is a schematic block diagram of an example computing device.

FIG. 2 is a schematic block diagram of an example computing device 200. In some instances, the computing device 200 may, for example, take the form of any computing device described above in relation to FIG. 1. The computing device 200 may include a wireless controller 202 configured to communicate with a host controller 204 via a host-controller interface (HCI) 206. Further, the computing device 200 includes a communication interface 208.

The wireless controller 202 may include any suitable logic, circuitry, interfaces, and/or code that facilitates transmission and/or receipt of signals over a BLE interface (e.g., the communication interface 208). For instance, the signals may include advertising packets, scan request packets, or scan response packets transmitted or received over one or more channels. By way of example, the wireless controller 202 includes a processor 210 and data storage 212. The processor 210 may be a baseband processor, for instance, and can include one or more central processing units (CPUs), such as one or more general purpose processors and/or one or more special-purpose processors (e.g., application-specific integrated circuits, digital signal processors, network processors, etc.). Further, processor 210 may execute firmware associated with operation of the wireless controller 202 for managing and/or providing support for communication link functionality of the wireless controller 202. Firmware executed by the processor 210 may also facilitate communication with the host controller 204 via the HCI 206. In some instances, the wireless controller 202 may be a Bluetooth module or BLE module of a device.

Data storage 212, in turn, may include volatile and/or non-volatile data storage and can be integrated in whole or in part with processor 210. Data storage 212 can store program logic 214 executable by processor 210, and data that may be manipulated to carry out the various methods, processes, or functions described herein. Alternatively, these methods, processes, or functions can be defined or performed by any combination of hardware, firmware, and/or software. By way of example, the program logic 214 may include program instructions, perhaps stored on a non-transitory, computer-readable medium, executable by the processor 210 to carry out any of the methods, processes, or functions disclosed herein.

The communication interface 208 may include a receiver or transceiver that includes suitable logic and/or circuitry to facilitate transmission and/or receiving of wireless signals in accordance with the BLE protocol or any related communication protocols. The communication interface 208 may include hardware appropriate for wired communication with another device as well. Functions of the communication interface 208 may be controlled by the wireless controller 202, via execution of program logic 214.

The HCI 206 may be implemented using one or more of several different hardware interfaces, such as universal asynchronous receiver/transmitter (UART), serial peripheral interface bus (SPI), universal serial bus (USB) interface, peripheral component interconnect (PCI), or any other suitable hardware interface.

Host controller 204 may include a processor 216 and data storage 218. Data storage 218 may include stored instructions of an operating system 220, among other stored data.

The processor 216 may include one or more central processing units (CPUs), such as one or more general purpose processors and/or one or more dedicated processors (e.g., application specific integrated circuits, digital signal processors, network processors, etc.). In one example, the host controller 204 may be configured to implement one or more upper layers of a Bluetooth stack in accordance with the BLE protocol. As described herein, the upper layers of the Bluetooth stack (e.g., L2CAP, RFCOMM, OBEX, and selected profiles) may be referred to as the host Bluetooth stack or the Bluetooth host stack. In some instances, the host controller 204 may include a main application processor of the computing device 200 (e.g., the operating system 222), for instance, and may implement the host Bluetooth stack. Alternatively, the host controller 204 or the processor 210 of the wireless controller 202 may be omitted, and functions of the host Bluetooth stack and the wireless controller 202 may be implemented by a single processor of multi-processor core (not shown).

The operating system 220 may be compatible with Bluetooth or BLE protocols, or other short-range wireless communication protocols. Additionally, in some instances, the operating system 220 may be configured as a multi-layered Linux platform or operating system. The operating system 220 may include different applications and/or an application framework, as well as various kernels, libraries, and runtime entities. In other examples, other formats or systems may operate the computing device 200 as well.

Figure 3:
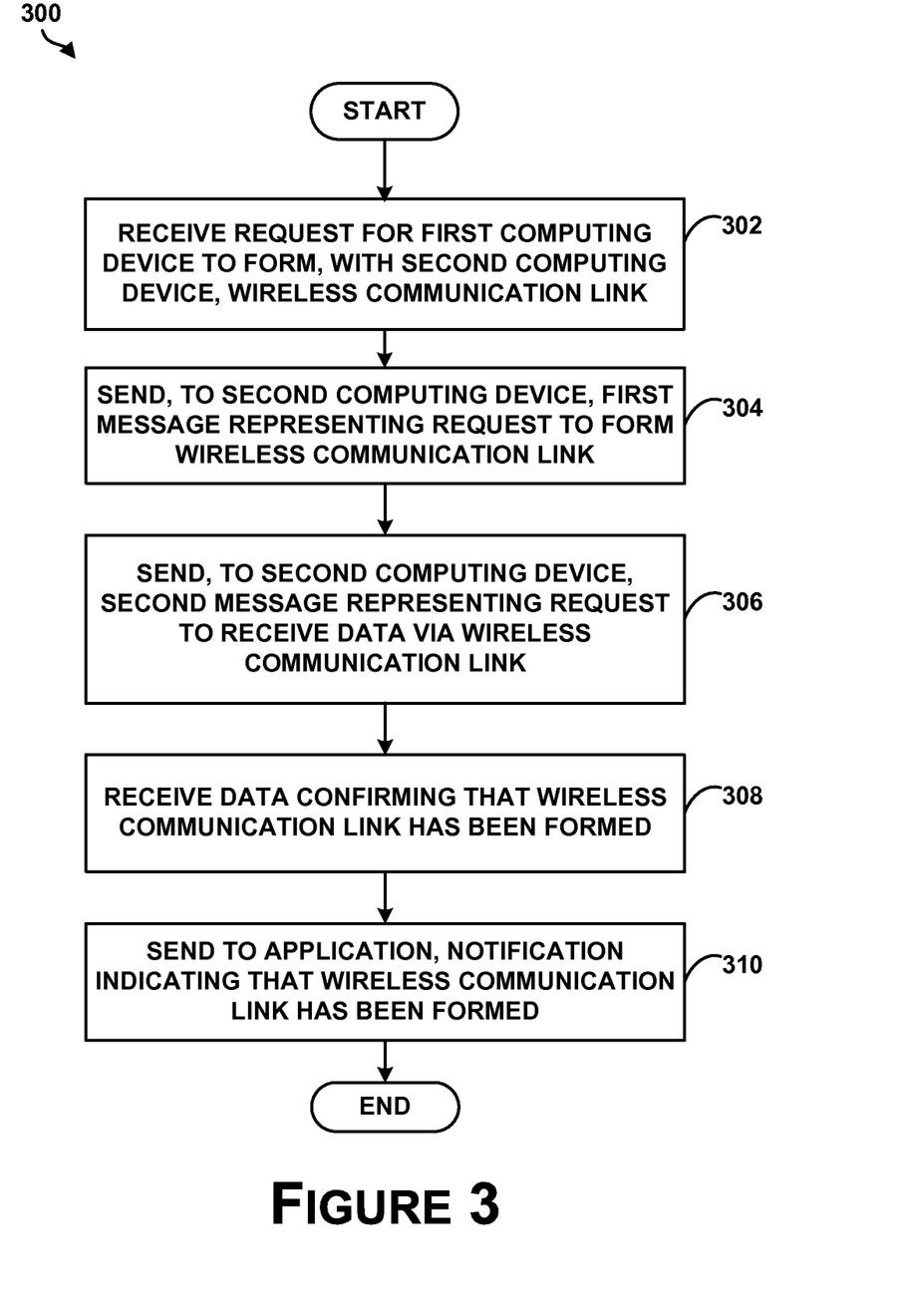
FIG. 3 is a block diagram of an example method.

FIG. 3 is a block diagram of an example method 300, in accordance with at least some embodiments described herein. Method 300 shown in FIG. 3 presents an embodiment of a method that, for example, could be used with one or more computing devices. Method 300 may include one or more operations, functions, or actions as illustrated by one or more blocks of 302-310. Although the blocks are illustrated in a sequential order, these blocks may in some instances be performed in parallel, and/or in a different order than those described herein. Also, the various blocks may be combined into fewer blocks, divided into additional blocks, and/or removed based on the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include a non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read-only memory (CD-ROM), for example. The computer-readable media may also be any other volatile or non-volatile storage systems. The computer-readable medium may be considered a computer-readable storage medium, a tangible storage device, or other article of manufacture, for example.

In addition, for the method 300 and other processes and methods disclosed herein, each block in FIG. 3 may represent circuitry that is wired to perform the specific logical functions in the process.

Figure 4:
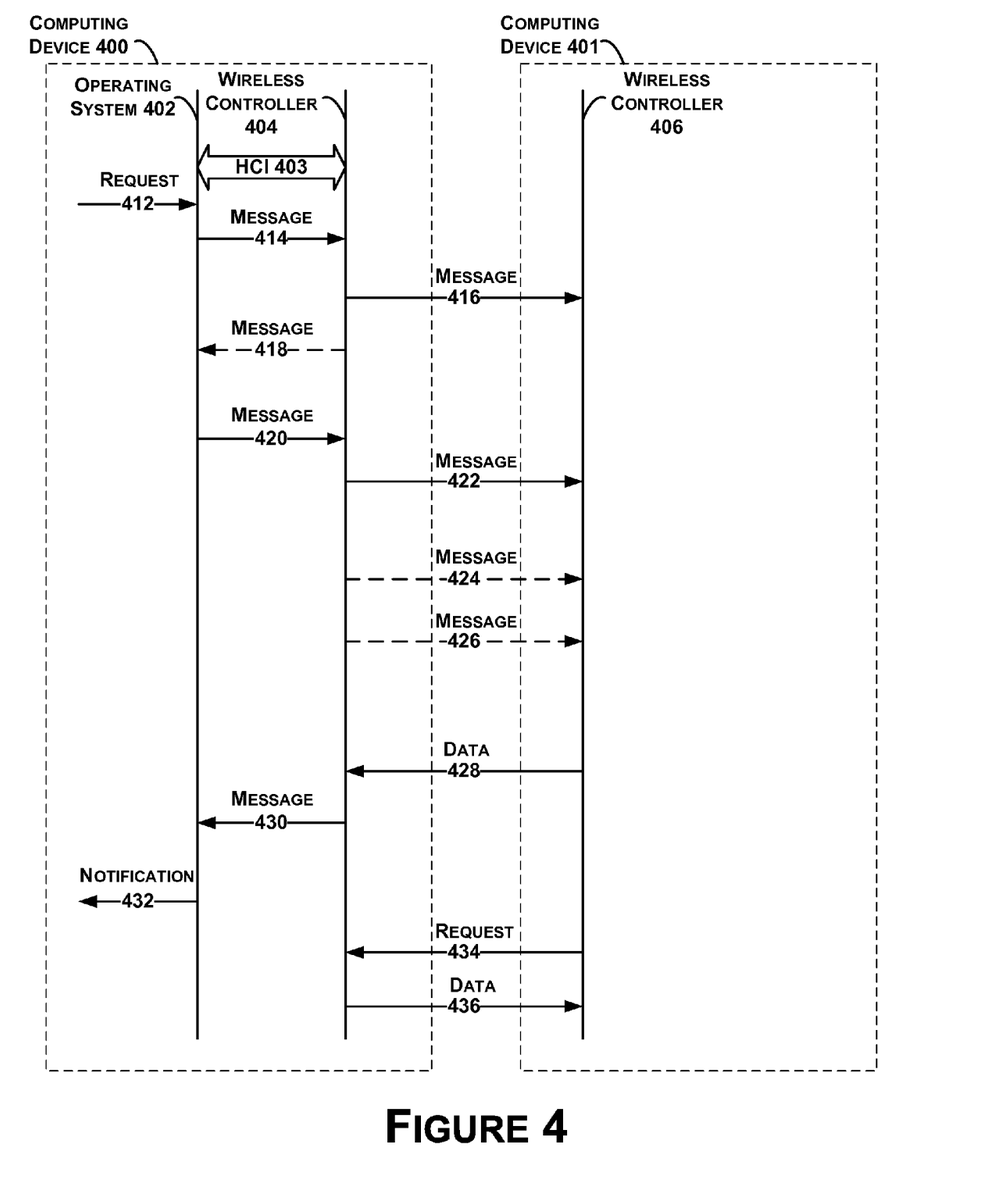
FIG. 4 illustrates example actions of computing devices.

In some instances, the method 300 may be performed by a first computing device executing an operating system. At block 302, the method 300 involves receiving a request for the first computing device to form, with a second computing device, a wireless communication link (e.g., a wireless communication link that conforms to a Bluetooth Low Energy (BLE) standard). The request may be received via the operating system from an application executed by the first computing device. Referring to FIG. 4 as an example, an operating system 402 executed by a computing device 400 may receive a request 412 from an application (not shown) also executed by the computing device 400. The application may include any set of program instructions executable by one or more processors of the computing device 400 and/or stored within data storage of the computing device 400. The application may be configured for coordinating receipt or transmission of data via the wireless communication link. For instance, the application may send the request 412 to the operating system 402 in response to the computing device 400 receiving input indicating a command to form the wireless communication link. In one example, the input may be received via a user-interface provided by the application.

At block 304, the method 300 involves sending, to the second computing device, a first message representing the request to form the wireless communication link. Referring to FIG. 4 as an example, a wireless controller 404 of the computing device 400 may send (e.g., wirelessly) a message 416 to a wireless controller 406 of another computing device 401. The message 416 may indicate one or more of (i) an address corresponding to the computing device 400, (ii) an address corresponding to the computing device 401, and (iii) at least one parameter characterizing the wireless communication link. For example, the message 416 may include one or more of (i) an address (e.g., a media access control (MAC) address) corresponding to the computing device 400 and/or the wireless controller 404, (ii) an address (e.g., a MAC address) corresponding to the second computing device 401 and/or the wireless controller 406, and (iii) at least one parameter (e.g., channel identifier(s), frequency band(s), communication timing information, etc.) characterizing a wireless communication link to be formed by the computing devices 400 and 401. The contents of the message 416 may be used by the computing device 401 to configure the wireless communication link.

In some examples, the wireless communication link may conform to a BLE standard and the message 416 may include a "CONNECT_REQ" command. Accordingly, the message 416 may include (i) a 48-bit data packet representing an address corresponding to the computing device 400, (ii) a 48-bit data packet representing an address corresponding to the computing device 401; (iii) a 32-bit data packet representing a (perhaps randomly generated) access address for the wireless communication link, (iv) a 24-bit data packet representing a (perhaps randomly generated) error-check code, (v) an 8-bit data packet representing respective durations of repeating time periods during which the computing devices 400 and 401 may communicate via the wireless communication link, (vi) a 16-bit data packet representing respective start times for the time periods; (vii) a 16-bit data packet representing how often the time periods repeat, (viii) a 16-bit data packet representing how many consecutive time periods during which the computing device 401 may refrain from communicating with the computing device 400, (ix) a 16-bit data packet representing a time out duration, where the computing devices 400 and 401 failing to communicate for at least the time out duration defines a failure of the wireless communication link, (x) a 40-bit data packet representing communication channels (e.g., frequency bands) that are respectively used and unused by the computing device 400 for other wireless communication links, (xi) a 5-bit data packet representing one or more parameters for selecting a new communication channel in the event that the wireless communication link fails, and/or (xii) a 3-bit data packet representing a maximum allowable deviation from timing protocols defining the wireless communication link.

In some examples, after the operating system 402 receives the request 412, the operating system 402 may use the HCI 403 to send, to the wireless controller 404, a message 414 indicating a command to form the wireless communication link. In this context, the wireless controller 404 may send the message 416 based on the wireless controller 404 receiving the message 414 from the operating system 402.

In some examples, the wireless communication link may conform to a BLE standard and the message 414 may include an "LE Create Connection" command. Accordingly, the message 414 may include data representing (i) durations of (e.g., repeating) scan time periods during which the computing device 400 may scan for data transmitted via the wireless communication link, (ii) how often the scan time periods may repeat, (iii) an address corresponding to the computing device 401, (iv) maximum and/or minimum durations of communication time periods during which the computing devices 400 and 401 may communicate via the wireless communication link, (v) a maximum number of consecutive time periods during which the computing device 401 may refrain from communicating with the computing device 400 via the wireless communication link, and/or (vi) a time out duration defining a minimum threshold for determining that the wireless communication link has failed.

After the operating system 402 sends the message 414 to the wireless controller 404, the wireless controller 404 may send a message 418 back to the operating system 402 via the HCI 403. The message 418 may indicate that the message 416 was sent to the computing device 401 by the computing device 400. In some examples, the operating system 402 may, in response to receiving the message 418, provide to the application a notification (such as a notification 432 discussed below) indicating that the wireless communication link has been formed. However, in other examples it may be beneficial for the operating system 402 to refrain from providing the notification until the wireless communication link has been confirmed.

In some examples, the wireless communication link may conform to a BLE standard and the message 418 may include an "LE Connection Complete" message. Accordingly, the message 418 may include data representing (i) an indication of whether the wireless communication link has been formed, (ii) an identifier or address corresponding to the wireless communication link, (iii) an indication of whether the computing device 400 has a master or slave role with respect to the wireless communication link, (iv) an indication of whether the computing device 401 is using a public or randomly generated device address, (v) a device address corresponding to the computing device 401, (vi) an indication of how often time periods during which the computing devices 400 and 401 use the wireless communication link repeat, (vii) an indication of how many consecutive time periods the computing device 401 may refrain from communicating with the computing device 400, (viii) a time out duration, where the computing devices 400 and 401 failing to communicate for at least the time out duration defines a failure of the wireless communication link, and/or (ix) a maximum allowable deviation from timing protocols defining the wireless communication link.

Accordingly, at block 306 the method 300 involves, prior to the operating system providing to the application a notification that the wireless communication link has been formed, sending, to the second computing device, a second message representing a request to receive data via the wireless communication link to confirm that the wireless communication link has been formed. For example, prior to the operating system 402 providing the notification 432 to the application, the wireless controller 404 may send (e.g., wirelessly), to the wireless controller 406 of the computing device 401, a message 422 representing a request to receive data via the wireless communication link to confirm that the wireless communication link has been formed. The message 422 may be sent in response to the wireless controller 404 receiving a message 420 from the operating system 402. In some examples, the message 422 may indicate one or more of (i) at least one feature supported by the computing device 400 and (ii) a request to receive data indicating at least one feature supported by the computing device 401. Such features supported by the computing device 400 and/or the computing device 401 may include communication and/or power management capabilities that pertain to either Bluetooth Version 4.0 or Bluetooth Version 4.1, for example. Other examples of features supported by the computing devices 400 or 401 are possible.

In some examples, the wireless communication link may conform to a BLE standard and the message 420 may include a "LE Read Remote Used Features" command. Accordingly, the message 420 may include an address or an identifier corresponding to the wireless communication link. Similarly, the message 422 may include an "LL_FEATURE_REQ" command. The message 422 may include data indicating one or more features supported by the computing device 400.

At block 308, the method 300 involves receiving, from the second computing device, the data confirming that the wireless communication link has been formed. For example, the wireless controller 404 may receive (e.g., wirelessly) the data 428 from the wireless controller 406. In some examples, the received data 428 may include data indicating at least one feature supported by the computing device 401 (e.g., communication and/or power management capabilities that pertain to either Bluetooth Version 4.0 or Bluetooth Version 4.1).

Prior to receiving the data 428, the computing device 400 may determine that a given duration of time has passed since the message 422 was sent by the computing device 400 to the computing device 401. For example, the passage of the given duration of time may indicate that the computing device 401 did not receive the message 422, or that the computing device 401 sent the data 428 but the data 428 was not received by the computing device 400. Either of these possibilities may indicate that the wireless communication link was not formed after the message 416 was sent.

Based on determining that the given duration of the time has passed since the message 422 was sent to the computing device 401, the computing device 400 may send, to the computing device 401, additional messages respectively representing (i) an additional request to form the wireless communication link and/or (ii) an additional request to receive data via the wireless communication link to confirm that the wireless communication link has been formed. Referring to FIG. 4, as an example, the computing device 400 may send, to the computing device 401, a message 424 and a message 426. The message 424 may represent an additional request to form the wireless communication link and the message 426 may represent an additional request to receive the data 428. The wireless communication link may perhaps be successfully formed after sending the additional messages 424 and/or 426, allowing the computing device 400 to receive the data 428 as a confirmation of the wireless communication link.

In some examples, based on determining that the given duration of time has passed since the message 422 was sent to the computing device 401, the computing device 400 may send to the operating system a notification (not shown) that the wireless communication link is not formed. In response to receiving the notification that the wireless communication link is not formed, the application may pause or otherwise cease executing functions that typically utilize data received from the computing device 401 via the wireless communication link.

In some instances, the computing device 400 may resend the additional messages one or more times because the wireless communication link has not been successfully formed. A duration of time that the computing device 400 waits before resending the additional messages may increase incrementally each time the computing device 400 fails to form the wireless communication link. For example, initially the computing device 400 may send a first set of additional messages. Five seconds may pass after sending the first set of additional messages without receiving the data 428, and based on the five seconds passing, the computing device 400 may send a second set of additional messages. Perhaps after an additional ten seconds passes without receiving the data 428, the computing device 400 may send a third set of additional messages. After an additional twenty seconds without receiving the data 428, the computing device 400 may send a fourth set of additional messages, and so on. In this way, the computing device 400 may periodically reattempt to form the wireless communication link, but may wait progressively longer periods of time as the failed requests to form the wireless communication link accumulate.

At block 310, the method 300 involves, based on receiving the data, sending via the operating system to the application, the notification indicating that the wireless communication link has been formed. For example, the operating system 402 may send the notification 432 based on the computing device 400 receiving the data 428. In some examples, this may include the wireless controller 404 sending a message 430 to the operating system 402 via the HCI 403, and the operating system 402 sending the notification 432 based on receiving the message 430. The message 430 may indicate to the operating system 402 that the data 428 has been received by the wireless controller 404. In some examples, the wireless communication link may conform to a BLE standard and the data 428 may include a "LL_FEATURE_RSP" message and the message 430 may include an "LE_Read_Remote_Used_Features_Complete" message. Accordingly, the data 428 may include data indicating one or more features supported by the computing device 401, and the message 430 may include data representing (i) an indication of whether the LE_Read_Remote_Used_Features command was successful, (ii) an address or identifier corresponding to the wireless communication link, and/or (iii) one or more features supported by the computing device 401.

In some cases, the received data may be first data. In this context, further functions related to the method 300 involve, subsequent to receiving the first data, receiving, from the second computing device, a request to receive second data via the wireless communication link to confirm that the wireless communication link is formed; and sending, to the second computing device, the second data confirming that the wireless communication link is formed. For example, sometime after sending the data 428 (confirming the wireless communication link to the computing device 400), the computing device 401 may request confirmation of the wireless communication link by sending (e.g., wirelessly) a request 434 to receive data confirming that the wireless communication link is (e.g., remains) formed. The request may be sent by the wireless controller 406 and received by the wireless controller 404. The request 434 may include data indicating at least one feature supported by the computing device 401, for example. In response to receiving the request 434, the computing device 400 may send (e.g., wirelessly) data 436. The data 436 may be sent by the wireless controller 404 and received by the wireless controller 406. The data 436 may include data indicating at least one feature supported by the computing device 400 (e.g., communication and/or power management capabilities that pertain to either Bluetooth Version 4.0 or Bluetooth Version 4.1). In some examples the request 434 may include a "LL_SLAVE_FEATURE_REQ" command and the data 436 may include a "LL_FEATURE_RSP" message. Accordingly, the request 434 may include data representing one or more features supported by the computing device 401, and the data 436 may include data representing one or more features supported by the computing device 400.

As an illustrative example, the application may be configured to facilitate collection of information related to physiological functions of a patient such as the patient's heart rate, respiratory rate, blood pressure, pulse, etc. For instance, the computing device 400 may be a tablet computer configured to communicate with the computing device 401 via a BLE wireless communication link. The computing device 401 may include or be in communication with a sensor configured to collect data characterizing one or more of the patient's heart rate, respiratory rate, blood pressure, and pulse. Before executing functions related to processing or providing the collected information via the user-interface, it may be beneficial for the computing device 400 to receive the data 428 confirming that the wireless communication link has been formed. By confirming that the wireless communication link has been formed before executing such functions, it becomes less likely that the application will "crash," "hang," or otherwise malfunction due to the wireless communication link failing.

Typically, a process of two Bluetooth-capable devices establishing a Bluetooth wireless communication link will include a discovery process and a pairing process. During an example discovery process, a first computing device may scan for discovery data sent by a second computing device. The discovery data may indicate that the second computing device is in a "discovery mode." For instance, the second computing device may transmit an address or an identifier corresponding to the second computing device, indicating to the first computing device (or another computing device) that the second computing device is configured and ready to form a wireless communication link.

Next, the pairing process may include the first computing device sending, to the second computing device, a message indicating a command to form the wireless communication link with the first computing device. The message may include authentication data such as an address, an identifier, and/or a passcode recognizable to the second computing device. In one example, the second computing device may display the passcode so that a user may provide the passcode to the first computing device, allowing the first computing device to authenticate by sending the passcode to the second computing device. Alternatively, the second computing device may send the passcode to the first computing device so that the first computing device may display the passcode. The user may then provide confirmation that the passcode displayed by the first computing device matches the passcode displayed by the second computing device, and the first computing device may use the confirmation to authenticate with the second computing device. After either of these authentication processes, the first computing device may form the wireless communication link with the second computing device.

In the context of Bluetooth versions that predate Bluetooth version 4.0 (e.g., "Bluetooth Classic"), after the first computing device authenticates with the second computing device, the second computing device may provide, to the first computing device, a message confirming that the wireless communication link has been formed. However, typically within the context of BLE standards (e.g., included in Bluetooth versions 4.0 and 4.1), no confirmation message is provided by the second computing device to the first computing device upon forming the wireless communication link. The methods and systems disclosed herein alleviate this problem by using pre-existing Bluetooth functions in a new way to confirm that the wireless communication link has been formed. For example, the first computing device may use an existing BLE command (e.g., "LL_FEATURE_REQ") to request that the second computing device return data (e.g., "LL_FEATURE_RSP"), to the first computing device, indicating features supported by the second computing device, indirectly confirming the wireless communication link by receiving such data.

It should be understood that arrangements described herein are for purposes of example only. As such, those skilled in the art will appreciate that other arrangements and other elements (e.g., machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method performed by a first computing device executing an operating system, the method comprising:
   receiving a request for the first computing device to form, with a second computing device, a wireless communication link, wherein the request is received via the operating system from an application executed by the first computing device;
   sending, to the second computing device, a first message representing the request to form the wireless communication link, wherein the first message indicates an address corresponding to the second computing device;
   prior to the operating system providing to the application a notification that the wireless communication link has been formed, sending, to the second computing device, a second message representing a request to receive data via the wireless communication link to confirm that the wireless communication link has been formed;
   receiving, from the second computing device, the data confirming that the wireless communication link has been formed; and
   based on receiving the data, sending via the operating system to the application, the notification indicating that the wireless communication link has been formed.

2. The method of claim 1, wherein the wireless communication link conforms to a Bluetooth Low Energy standard.

3. The method of claim 1, further comprising:
   sending, via a host controller interface of the operating system to a wireless controller of the first computing device, a third message representing a command to form the wireless communication link; and
   based on the wireless controller receiving the third message, sending, by the wireless controller, the first message representing the request to form the wireless communication link.

4. The method of claim 1, wherein the first message indicates at least one parameter characterizing the wireless communication link.

5. The method of claim 1, wherein the first message indicates an address corresponding to the first computing device.

6. The method of claim 1, wherein the first message indicates an access address for the wireless communication link.

7. The method of claim 1, wherein the first message indicates respective durations of repeating time periods during which the first computing device and the second computing device communicate via the wireless communication link.

8. The method of claim 7, wherein the first message indicates respective start times for the time periods.

9. The method of claim 1, wherein the second message indicates at least one feature supported by the first computing device or represents a request to receive data indicating at least one feature supported by the second computing device.

10. The method of claim 1, wherein the received data indicates at least one feature supported by the second computing device.

11. The method of claim 1, further comprising:
prior to receiving the data confirming that the wireless communication link has been formed, determining that a given duration of time has passed since the second message was sent to the second computing device;
based on the determination, sending additional messages respectively representing (i) an additional request to form the wireless communication link and (ii) an additional request to receive data via the wireless communication link to confirm that the wireless communication link has been formed; and
receiving the data after sending the additional messages.

12. The method of claim 11, further comprising:
determining a duration of time based on one or more failed requests to form the wireless communication link;
ascertaining that the determined duration of time has passed; and
sending the additional messages based on ascertaining that the determined duration of time has passed.

13. The method of claim 12, further comprising, prior to receiving the data, sending, via the operating system to the application, a notification that the wireless communication link is not formed.

14. The method of claim 1, wherein the data is first data, the method further comprising:
subsequent to receiving the first data, receiving, from the second computing device, a request to receive second data via the wireless communication link to confirm that the wireless communication link is formed; and
sending, to the second computing device, the second data confirming that the wireless communication link is formed.

15. A non-transitory computer-readable medium storing instructions therein that, when executed by a first computing device configured to execute an operating system, cause the first computing device to perform functions comprising:
receiving a request for the first computing device to form, with a second computing device, a wireless communication link, wherein the request is received via the operating system from an application executed by the first computing device;
sending, to the second computing device, a first message representing the request to form the wireless communication link, wherein the first message indicates an address corresponding to the second computing device;
prior to the operating system providing to the application a notification that the wireless communication link has been formed, sending, to the second computing device, a second message representing a request to receive data via the wireless communication link to confirm that the wireless communication link has been formed;
receiving, from the second computing device, the data confirming that the wireless communication link has been formed; and
based on receiving the data, sending via the operating system to the application, the notification indicating that the wireless communication link has been formed.

16. The non-transitory computer-readable medium of claim 15, wherein the wireless communication link conforms to a Bluetooth Low Energy standard.

17. A computing device configured to execute an operating system, the computing device comprising:
one or more processors; and
a computer-readable medium storing instructions therein that, when executed by the one or more processors, cause the computing device to perform functions comprising:
receiving a request for the computing device to form, with a second computing device, a wireless communication link, wherein the request is received via the operating system from an application executed by the computing device;
sending, to the second computing device, a first message representing the request to form the wireless communication link, wherein the first message indicates an address corresponding to the second computing device;
prior to the operating system providing to the application a notification that the wireless communication link has been formed, sending, to the second computing device, a second message representing a request to receive data via the wireless communication link to confirm that the wireless communication link has been formed;
receiving, from the second computing device, the data confirming that the wireless communication link has been formed; and
based on receiving the data, sending via the operating system to the application, the notification indicating that the wireless communication link has been formed.

18. The computing device of claim 17, wherein the wireless communication link conforms to a Bluetooth Low Energy standard.

19. The method of claim 1, wherein the notification is sent to the application via a host controller interface of the operating system.

20. The non-transitory computer-readable medium of claim 15, wherein the notification is sent to the application via a host controller interface of the operating system.

* * * * *